United States Patent
Kojima et al.

(10) Patent No.: US 12,028,560 B2
(45) Date of Patent: Jul. 2, 2024

(54) CONTENT CORRECTION DEVICE, CONTENT DELIVERY SERVER, CONTENT CORRECTION METHOD, AND RECORDING MEDIUM

(71) Applicant: DWANGO Co., Ltd., Tokyo (JP)

(72) Inventors: Takashi Kojima, Tokyo (JP); Kazuomi Niwa, Tokyo (JP)

(73) Assignee: DWANGO Co., Ltd., Tokyo (JP)

( * ) Notice: Subject to any disclaimer, the term of this patent is extended or adjusted under 35 U.S.C. 154(b) by 22 days.

(21) Appl. No.: 17/911,817

(22) PCT Filed: Oct. 1, 2021

(86) PCT No.: PCT/JP2021/036472
§ 371 (c)(1),
(2) Date: Sep. 15, 2022

(87) PCT Pub. No.: WO2022/163023
PCT Pub. Date: Aug. 4, 2022

(65) Prior Publication Data
US 2023/0133367 A1 May 4, 2023

(30) Foreign Application Priority Data
Jan. 29, 2021 (JP) .................................. 2021-013968

(51) Int. Cl.
*H04N 21/234* (2011.01)
*H04N 21/2743* (2011.01)

(52) U.S. Cl.
CPC ....... *H04N 21/234* (2013.01); *H04N 21/2743* (2013.01)

(58) Field of Classification Search
None
See application file for complete search history.

(56) References Cited

U.S. PATENT DOCUMENTS

2017/0242558 A1  8/2017  Song et al.
2019/0253744 A1* 8/2019  Huang ............... H04N 21/251
(Continued)

FOREIGN PATENT DOCUMENTS

CN   105657479 A   6/2016
CN   107959863 A   4/2018
(Continued)

OTHER PUBLICATIONS

International Search Report (with English Translation) and Written Opinion (with Machine Translation) issued on Dec. 21, 2021 in corresponding International Patent Application No. PCT/JP2021/036472; 12 pages.
(Continued)

*Primary Examiner* — James R Marandi
(74) *Attorney, Agent, or Firm* — Maier & Maier, PLLC (57) ABSTRACT

A content correction device, a content delivery server, a content correction method, and a recording medium for correcting a portion of content that requires complaint resolution without impairing quality or enjoyability. The content correction device includes: an acquisition unit acquiring complaint information; a specification unit acquiring the data of content that requires complaint resolution from a storage unit where the data of a plurality of delivered content is stored and specifying a relevant correction period in the time line of the content that requires complaint resolution, in which period the complaint to be resolved is included; and a corrected content generation unit acquiring from the storage unit the data of first content correcting the relevant correction period, generating, using at least a portion of the first content, second content that does not contain the complaint to be resolved, and storing the data of the second content in the storage unit.

8 Claims, 4 Drawing Sheets

(56) References Cited

U.S. PATENT DOCUMENTS

| | | |
|---|---|---|
| 2020/0210552 A1 | 7/2020 | McSchooler |
| 2020/0243115 A1 | 7/2020 | Witt et al. |
| 2023/0133367 A1* | 5/2023 | Kojima ................ H04N 21/233 |
| | | 725/115 |

FOREIGN PATENT DOCUMENTS

| | | |
|---|---|---|
| CN | 108419105 A | 8/2018 |
| JP | 2002318874 A | 10/2002 |
| JP | 2014-42156 A | 3/2014 |
| JP | 2014-67131 A | 4/2014 |
| JP | 2019-47366 A | 3/2019 |

OTHER PUBLICATIONS

More information and better tools to resolve manual Content ID claims [online]. Jul. 9, 2019. [retrieval date Sep. 21, 2021], internet: <URL: https://blog.youtube/news-and-events/better-tools-to-resolve-manual-Content-ID-claims/>.

Japanese Office Action (with Machine Translation) issued on Apr. 27, 2021 in corresponding Patent Application No. 2021-013968; 8 pages.

Japanese Office Action (with Machine Translation) issued on Sep. 28, 2021 in corresponding Patent Application No. 2021-013968; 12 pages.

Japanese Decision of Refusal (with Machine Translation) issued on Feb. 22, 2022 in corresponding Patent Application No. 2021-013968; 2 pages.

Japanese Decision of Dismissal of Amendment (with Machine Translation) issued on Feb. 22, 2022 in corresponding Patent Application No. 2021-013968; 13 pages.

Office Action issued on May 23, 2023, in corresponding Chinese Application No. 202180023510.9, 18 pages.

Office Action issued on Dec. 1, 2023, in corresponding Chinese Application No. 202180023510.9, 12 pages.

* cited by examiner

CONTENT CORRECTION DEVICE, CONTENT DELIVERY SERVER, CONTENT CORRECTION METHOD, AND RECORDING MEDIUM

FIELD

The present invention relates to a content correction device, a content delivery server, a content generating method, and a recording medium.

BACKGROUND

In the related art, a technology of delivering various content through a network is provided. In addition, it is possible for more people to easily deliver moving images captured by themselves and sounds recorded by themselves, in accordance with the spread of a mobile communication terminal or the availability of high-speed communication. As a result thereof, a lot of content delivered in the past is accumulated.

For example, in a case where a deliverer uploads video content to a delivery server, and the delivery of the content is started, a complaint with respect to the contents of the content may be received. For example, in a case where music with the copyright is used in the content without permission or in a case where a person who does not want to appear in the video appears in the video of the content, a complaint is transmitted to the content.

Such a complaint, for example, is delivered to the deliverer by a person who disputes the contents of the content sending the complaint to a delivery server or by transmitting a message for disputing the contents with SNS.

For the deliverer, the easiest and simplest response is to delete the content itself that has received the complaint, and there are many cases in which some deliverers desire to continuously deliver the content that requires complaint resolution by correcting a portion of the content. In this case, the deliverer may personally edit the content that requires complaint resolution, and may correct the content by pixelating a portion, by deleting the corresponding frame, or by superimposing a sound effect or a self-regulatory sound (such as a beep sound) on a portion of the sound.

CITATION LIST

Patent Document 1: JP-A-2019-47366

SUMMARY

As described above, in a case of uniformly correcting a portion of the content, there is a possibility that the quality or the enjoyability of the content is impaired. In contrast, in a case where it is possible to correct the content not to include a portion that requires complaint resolution, for example, by using other content images or sounds, without simply deleting a portion of the content or pixelating the image, there is a possibility that it is possible to correct the content without impairing the quality or the enjoyability of the content.

However, it is difficult for the deliverers themselves to determine which portion of which content is a portion that does not require complaint resolution, and in a case where the selected content includes the portion that requires complaint resolution, the complaint may be received again. Accordingly, it takes a lot of work and time for the deliverer to select other content that can be used to correct the own content from a huge number of content and to correct the content that requires complaint resolution.

The invention has been made in consideration of the circumstances described above, and an object thereof is to provide a content correction device, a content delivery server, a content correction method, and a recording medium for correcting a portion of content that requires complaint resolution without impairing the quality or the enjoyability of the content.

A content correction device according to the first aspect of the invention, includes: an acquisition unit for acquiring complaint information including at least information of a complaint to be resolved and identification information of content that requires complaint resolution; a specification unit for acquiring data of the content that requires complaint resolution from a storage unit in which data of a plurality of delivered content is stored, on the basis of the identification information of the content that requires complaint resolution, and specifying a relevant correction period in which the complaint to be resolved is included in a time line of the content that requires complaint resolution, on the basis of the information of the complaint to be resolved; and a corrected content generation unit for acquiring data of first content for correcting the complaint to be resolved that is included in the relevant correction period from the storage unit, generating second content in which the complaint to be resolved is not included by using at least a portion of the first content, and storing data of the second content as the data of the content in the storage unit.

In the first aspect, in the content correction device according to the second aspect of the invention, the information of the complaint to be resolved includes at least any one of information of an image that requires complaint resolution, information of a sound that requires complaint resolution, and a period that requires complaint resolution.

In the first aspect or the second aspect, in the content correction device according to the third aspect of the invention, the specification unit specifies a timing when a predetermined motion is started in the relevant correction period, and the corrected content generation unit acquires the data of the first content in which the predetermined motion is included from the storage unit, and corrects the relevant correction period by using at least one of an image and a sound of a portion of the first content that is trimmed such that a timing of the predetermined motion in the first content is coincident with the timing of the predetermined motion in the relevant correction period.

In any one of the first aspect to the third aspect, in the content correction device according to the fourth aspect of the invention, the specification unit specifies a feature of the complaint to be resolved, and the corrected content generation unit selects at least one of the first content from the data of the plurality of delivered content stored in the storage unit, by using information of the feature of the complaint to be resolved.

In any one of the first aspect to the fourth aspect, in the content correction device according to the fifth aspect of the invention, the specification unit stores the complaint information in the storage unit in association with the data of the content that is specified as the content that requires complaint resolution, and the corrected content generation unit sets the content in which a predetermined period or longer has elapsed after a delivery is started and the complaint information is not included or the content in which the number of times of viewing is predetermined number or more and the complaint information is not included, among the plurality of delivered content stored in the storage unit, to a candidate of the first content.

In any one of the first aspect to the fifth aspect, in the content correction device according to the sixth aspect of the invention, the complaint to be resolved is an image that requires complaint resolution, the specification unit further specifies an area that requires complaint resolution in which the image that requires complaint resolution is included in a frame of the relevant correction period, and the corrected content generation unit trims an image corresponding to the area that requires complaint resolution from a frame of the first content, and generates the second content in which the area that requires complaint resolution is corrected by using the trimmed image.

A content delivery server according to the seventh aspect of the invention, includes: the content correction device according to any one of the first aspect to the sixth aspect; a delivery unit for being capable of delivering the data of the content stored in the storage unit; and a delivery control unit for controlling the delivery unit such that the data of the content is delivered to a viewer terminal that requests a delivery.

A content correction method according to the eighth aspect of the invention, includes: acquiring complaint information including at least information of a complaint to be resolved and identification information of content that requires complaint resolution; acquiring data of the content that requires complaint resolution from a storage unit in which data of a plurality of delivered content is stored, on the basis of the identification information of the content that requires complaint resolution, and specifying a relevant correction period in which the complaint to be resolved is included in a time line of the content that requires complaint resolution, on the basis of the information of the complaint to be resolved; and acquiring data of first content for correcting the complaint to be resolved that is included in the relevant correction period from the storage unit, generating second content in which the complaint to be resolved is not included by using at least a portion of the first content, and storing data of the second content as the data of the content in the storage unit.

A computer-readable recording medium according to the ninth aspect of the invention stores a content correction program allowing a computer to execute: an acquisition function of acquiring complaint information including at least information of a complaint to be resolved and identification information of content that requires complaint resolution; a specification function of acquiring data of the content that requires complaint resolution from a storage unit in which data of a plurality of delivered content is stored, on the basis of the identification information of the content that requires complaint resolution, and specifying a relevant correction period in which the complaint to be resolved is included in a time line of the content that requires complaint resolution, on the basis of the information of the complaint to be resolved; and a corrected content generation function of acquiring data of first content for correcting the complaint to be resolved that is included in the relevant correction period from the storage unit, generating second content in which the complaint to be resolved is not included by using at least a portion of the first content, and storing data of the second content as the data of the content in the storage unit.

According to the invention, it is possible to provide a content correction device, a content delivery server, a content correction method, and a recording medium for correcting a portion of content that requires complaint resolution without impairing the quality or the enjoyability of the content.

DETAILED DESCRIPTION

Hereinafter, a plurality of embodiments of the invention will be described in detail with reference to the drawings. Note that, in the following description, the same reference numerals will be applied to configurations and constituents same as or similar to configurations that are already described, and the description thereof will be omitted.

Figure 1:
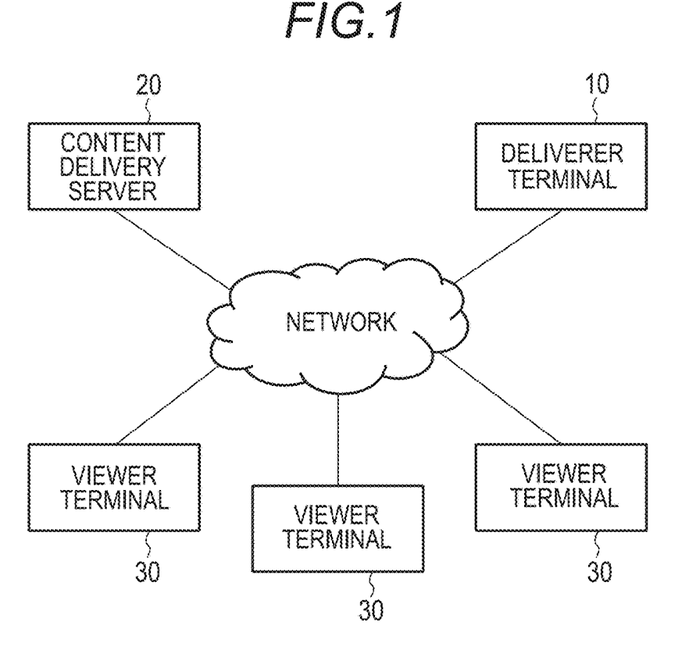
FIG. 1 is a diagram schematically illustrating one configuration example of a content delivery system including a content correction device and a content delivery server of one embodiment.

An example of a content delivery system including a content correction device and a content delivery server of a first embodiment will be described below with reference to the drawings. FIG. 1 is a diagram schematically illustrating one configuration example of a content delivery system including a content correction device and a content delivery server of one embodiment. The content delivery system of this embodiment includes a deliverer terminal 10 and a content delivery server 20.

The deliverer terminal 10 is connected to the content delivery server 20 through a network such that communication can be performed. The deliverer terminal 10, for example, can be an electronic device such as a computer connected to a moving image source such as a video camera, for example, a television (including an internet television), a personal computer (PC), a mobile terminal (for example, a tablet, a smart phone, a laptop, a feature phone, a portable gaming console, a digital music player, an e-book reader, and the like), a virtual reality (VR) terminal, an augmented reality (AR) terminal, and the like, but is not limited thereto. The deliverer terminal 10 is capable of sequentially transmitting encoded video data that is output from the moving image source to the content delivery server 20.

The content delivery server 20 can be connected to the deliverer terminal 10 and a viewer terminal 30 through a network such that communication can be performed. The content delivery server 20 may include a processor executing a program for attaining various functions described below and a memory storing a program. The processor is typically a central processing unit (CPU) and/or a graphics processing unit (GPU), and may be a microcontroller, a field programmable gate array (FPGA), a digital signal processor (DSP), or the like. In addition, the memory stores the program that is executed by the processor to attain the operation of the content delivery server 20, and temporarily stores data or the like that is used by the processor. Note that, the program may be stored in a recording medium that can be read by the content delivery server (a computer) 20. In this case, the processor is capable of attaining various functions by executing the program read from the recording medium. The content delivery server 20 of this embodiment may include the content correction device.

The viewer terminal 30 can be connected to the content delivery server 20 through a network such that communication can be performed. Note that, the viewer terminal 30 is an electronic device such as a computer, and for example, can be a television (including an internet television), a personal computer (PC), a mobile terminal (for example, a tablet, a smart phone, a laptop, a feature phone, a portable gaming console, a digital music player, an e-book reader, a smart watch, and the like), a virtual reality (VR) terminal, an augmented reality (AR) terminal, and the like, but is not limited thereto. Note that, the number of viewer terminals 30 connected to the network can be zero, and can be frequently increased and decreased.

Figure 2:
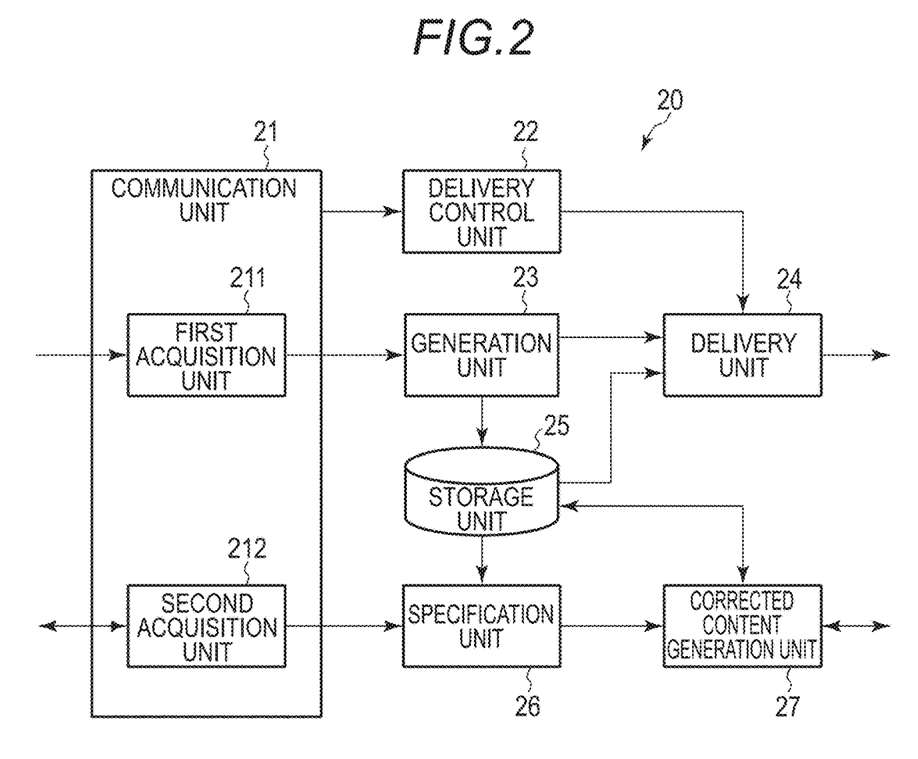
FIG. 2 is a diagram schematically illustrating one configuration example of the content delivery server illustrated in FIG. 1.

FIG. 2 is a diagram illustrating one configuration example of the content delivery server illustrated in FIG. 1. The content delivery server 20 includes an acquisition unit 21 (a first acquisition unit 211 and a second acquisition unit 212), a delivery control unit 22, a generation unit 23, a delivery unit 24, a specification unit 26, a corrected content generation unit 27, and a storage unit 25. Note that, the content correction device of this embodiment may include at least the second acquisition unit 212, the specification unit 26, and the corrected content generation unit 27. The content correction device may be configured integrally with the content delivery server 20, and the content correction device and the content delivery server 20 may share one or a plurality of configurations. In addition, the content correction device may have a configuration in which the content correction device is externally attached to the content delivery server 20 and is connected to the content delivery server 20 such that communication can be performed.

The content delivery server 20 may further include a communication unit (not illustrated) that can be connected to a network. The communication unit is capable of communicating with the deliverer terminal 10 and the viewer terminal 30 through the network, and may include the first acquisition unit 211 and the second acquisition unit 212. For example, the communication unit receives moving image data from the deliverer terminal 10, receives a delivery request from the viewer terminal 30, or communicates with the deliverer terminal 10 in order to approve second content. The communication unit transmits the delivery request received from the viewer terminal 30 to the delivery control unit 22.

The storage unit 25 may be built in the content delivery server 20, or may be externally attached to the content delivery server 20. The storage unit 25, for example, may include a non-volatile storage medium such as a hard disk drive (HDD) and a solid state drive (SSD). Note that, the storage unit 25 may include a region for accumulating data of a plurality of content of moving images or sounds delivered in the past. The data of the content, for example, can be stored in the storage unit 25 by associating content data with tag information of content, identification information of a deliverer, category information, delivery start date information, editing history information, the number of times of viewing, the number of viewers, comment information, complaint information, or the like.

The storage unit 25 may be shared between the content delivery server 20 and the content correction device, or the storage unit 25 may be provided in each of the content delivery server 20 and the content correction device. In addition, the data of the content accumulated in the storage unit 25 is not limited to the data of the content delivered by the content delivery server 20, and for example, the data of the delivered content may be processed or edited, or the data of the content after being corrected by the content correction device or the data of the content before being delivered may be stored.

The first acquisition unit 211 is capable of receiving the content data that is sequentially transmitted from the deliverer terminal 10 through the network. For example, the first acquisition unit 211 is capable of receiving the content data such as moving image data or sound data for real-time delivery from the deliverer terminal 10. In addition, the first acquisition unit 211 is capable of receiving input information such as a comment that is sequentially transmitted from the viewer terminal 30 through the network. The first acquisition unit 211 transmits the received content data and the received input information such as the comment to the generation unit 23.

The generation unit 23 is capable of receiving the content data and the input information from the first acquisition unit 211, and for example, is capable of generating content data for a delivery that enables the viewer terminal 30 to generate content data in which the input information is superimposed on the moving image data. In addition, the generation unit 23, for example, may generate moving image data in which the input information is superimposed on the moving image data as the content data for a delivery. The generation unit 23, for example, may synthesize the moving image data with the input information by using a known technique such as alpha blending and picture-in-picture. The generation unit 23 transmits the generated content data for a delivery to the delivery unit 24. In addition, the generation unit 23 is capable of storing the generated content data for a delivery in the storage unit 25.

The generation unit 23, for example, may be capable of synthesizing the moving image data with the input information by resizing a portion of the screen or the entire screen of a playback video of the moving image data or by trimming a portion of the screen, or may be capable of synthesizing the moving image data with input information such that a portion of the screen of the playback video of the moving image data is exposed, and the remnant is concealed. In addition, the generation unit 23 may generate a plurality of content data for a delivery with different images to be displayed and may transmit the plurality of content data for a delivery to the delivery unit 24 in order to enable the plurality of content data for a delivery to be switched and delivered in accordance with the delivery request from the viewer terminal 30. The generation unit 23, for example, may generate the content data for a delivery that is generated without superimposing the input information on the image data, and the content data for a delivery that is generated by superimposing the input information on the image data, and may transmit the content data for a delivery to the delivery unit 24.

The delivery unit 24 is capable of being connected to a network such that communication can be performed, of receiving the content data for a delivery from the generation unit 23, and of delivering the content data for a delivery to the viewer terminal 30 that receives the delivery request of the content data for a delivery. In addition, the delivery unit 24 is capable of acquiring the content data for a delivery that is stored in the storage unit 25, and of delivering the content data for a delivery to the viewer terminal 30 that receives the delivery request of the content data for a delivery. The delivery unit 24, for example, controls a delivery destination of the content data for a delivery, or the like by the delivery control unit 22.

Note that, the delivery unit 24 may immediately destroy the delivered content data for a delivery, and for example, may perform buffering for a predetermined period such that replay or slow motion playback is available.

The delivery control unit 22 controls the data for a delivery. The delivery control unit 22, for example, includes a clock that is not illustrated, compares time information obtained from the clock with a time frame assigned to the delivery of the image data, and manages the start and end of the delivery of the image data. In addition, the delivery control unit 22 accepts the delivery request of the viewer terminal 30 from the communication unit, and controls the delivery unit 24 such that the image data is delivered to the viewer terminal 30.

The second acquisition unit 212 receives complaint information with respect to the delivered content. The second acquisition unit 212 transmits the received complaint information to the specification unit 26. The complaint information that is acquired by the second acquisition unit 212, for example, may include at least identification information of content that requires complaint resolution and information of a complaint to be resolved, and may further include identification information of a complaint transmission source, time line information to be the complaint to be resolved, detailed information of complaint contents, and the like. In addition, the complaint information may include identification information indicating that the complaint is determined in advance to be valid on the basis of the Copyright Act, Digital Millennium Copyright Act (DMCA), or the like. In addition, the information of the complaint to be resolved includes at least any one of information of an image that requires complaint resolution, information of a sound that requires complaint resolution, and information of a period that requires complaint resolution.

The second acquisition unit 212 may receive only the complaint information that satisfies a predetermined condition. The second acquisition unit 212, for example, may receive only the complaint information from the complaint transmission source registered in advance, and for example, may receive only the complaint information that has been determined as a complaint.

The specification unit 26 specifies the content that requires complaint resolution, on the basis of the complaint information received from the second acquisition unit 212, and specifies a relevant correction period (including at least one of a relevant image correction period and a relevant sound correction period) of the specified content that requires complaint resolution. Note that, a plurality of relevant correction periods can be included in one content that requires complaint resolution.

The specification unit 26 is capable of specifying the content that requires complaint resolution from the content data stored in the storage unit 25, by using the identification information of the content that requires complaint resolution that is included in the complaint information. The specification unit 26 may store the corresponding complaint information in the storage unit 25 in association with the specified content data.

The specification unit 26, for example, is capable of specifying the relevant image correction period in a time line of the content that requires complaint resolution, on the basis of the information of the image that requires complaint resolution that is included in the complaint information. In addition, in a case where the image that requires complaint resolution is included in the complaint information, the specification unit 26, for example, recognizes the image that requires complaint resolution that is included in the image of the content that requires complaint resolution, and sets a period corresponding to a frame in which the image that requires complaint resolution is included in the time line of the content to the relevant image correction period. Further, the specification unit 26 may specify the area (a portion) of the frame in which the image that requires complaint resolution in the relevant image correction period is included. In this case, information of the relevant image correction period includes information of an area that requires complaint resolution in the frame in the relevant image correction period.

The specification unit 26 may detect a timing when an arbitrary motion of the image that requires complaint resolution is started, at a timing when the relevant image correction period is started. For example, a motion such as a person starting to speak, starting to dance, starting to walk, starting to run, or having a meal may be detected at the timing when the relevant image correction period is started, and for example, the motion of a ride starting to move, the motion of starting the play of a game, the motion of an image to be displayed on a play screen of a game, or the like may be detected. When detecting the motion at the timing when the relevant image correction period is started, the specification unit 26 includes identification information for identifying the detected motion in the information of the relevant image correction period. Note that, the specification unit 26 may detect a timing when the motion of the image is started over the entire period of the relevant image correction period. In this case, the specification unit 26 includes the identification information for identifying the detected motion and information of a start timing of the motion in the information of the relevant image correction period.

In addition, the specification unit 26 may specify a feature such as the gender, the age group, the height and size, the clothing color, and the hair, eye, or skin color of a person or a character of the complaint to be resolved, or a feature such as the background of the image, from the image that requires complaint resolution or an image of the entire frame including the image that requires complaint resolution. In addition, in a case where the image that requires complaint resolution is an image of an unreleased product such as a moving vehicle such as an unreleased car or rail vehicle, and an electronic device such as a smart phone or a tablet terminal, the specification unit 26 may specify a feature such as the category, the color, or the size of an object of the image that requires complaint resolution. For example, when specifying the feature of a person or an object that is the complaint to be resolved and the feature of an image other than the complaint to be resolved, the specification unit 26 is capable of including identification information for identifying the specified feature in the information of the relevant image correction period.

In addition, the specification unit 26, for example, is capable of specifying the relevant sound correction period in the time line of the content that requires complaint resolution, on the basis of the information of the sound that requires complaint resolution that is included in the complaint information. In a case where the sound that requires complaint resolution is included in the complaint information, the specification unit 26, for example, recognizes the sound that requires complaint resolution included in the content that requires complaint resolution, and sets a period in which the sound that requires complaint resolution is included, among the time line of the content data, to the relevant sound correction period. The information of the sound that requires complaint resolution may include a producer of a medium such as a record or a CD, information of a technical director, a production date, information of a composer or a lyric writer, information of a performer or a singer in another performance of the music, information of a performer or a singer of the performance, information of a label or the like, the title of the music, lyrics or a portion of the lyrics, a colloquial term or a popular name of the music, and information of a television program, a movie, or the like in which the music is used. For example, in a case where information that is necessary for recognizing the sound that requires complaint resolution can be acquired through a network, the specification unit 26 may acquire the necessary information through the network.

Note that, it can also be considered that, for example, music with the copyright is arranged and used or a sound covering the music with the copyright is included, in the content that requires complaint resolution. Specifically, for example, there may be a possibility that game music is arranged in a jazz style or is performed by the orchestra, and for example, a possibility that the music of a male singer is covered by a female singer. In order to respond to such a case, the specification unit 26 may set not only a period in which the sound that requires complaint resolution itself is recognized but also a period in which a sound for arranging or covering the sound that requires complaint resolution is recognized as the relevant sound correction period. The specification unit 26, for example, is capable of specifying the sound for arranging or covering the sound that requires complaint resolution by melody analysis (morphological analysis) or the recognition of the lyrics from the sound of the content that requires complaint resolution.

Similarly, even in a case where the copyright of the music expires, but for example, a performer, a record producer, a broadcaster, or the like possesses the related rights of the music, the melody or the like included in the sound data of the content that requires complaint resolution is analyzed, and in a case where the performance corresponds to the complaint to be resolved, the system may specify the time line in which the performance is included by the specification unit 26, and may set the time line to the relevant sound correction period. As described above, the same applies to other Examples in that the music with the related rights is also corrected.

In addition, the specification unit 26, for example, may detect the feature (a conversation, the genre of music, a gender, and a language) of the sound that requires complaint resolution at a timing when the relevant sound correction period is started. When specifying the feature of the sound that requires complaint resolution of the relevant sound correction period, the specification unit 26 is capable of including identification information for identifying the specified feature in the information of the relevant sound correction period.

For example, the specification unit 26 may include a learned model for specifying the motion or the feature of the image that requires complaint resolution of the relevant image correction period, or the arrangement of the relevant sound correction period, a covered (arranged) sound, or the feature of the sound. The learned model, for example, is a learned model for specifying the motion, the arrangement, or the feature of a playback image or sound of the content data by deep learning such as a convolution neural network (CNN), using the content data satisfying a predetermined condition as input. In a case where a plurality of motions, arrangements, or features are assumed in the content data, the specification unit 26 may include a plurality of learned models respectively corresponding to the plurality of motions, arrangements, or the features.

In addition, the specification unit 26, for example, may set a period corresponding to the period that requires complaint resolution in the time line of the content that requires complaint resolution as the relevant image correction period and the relevant sound correction period, on the basis of the period that requires complaint resolution that is included in the complaint information. The specification unit 26 transmits the information of at least one of the relevant image correction period and the relevant sound correction period, and the data of the content that requires complaint resolution to the corrected content generation unit 27.

The corrected content generation unit 27 sets the condition of first content used in correction (content for correction), on the basis of the information of at least one of the relevant image correction period and the relevant sound correction period, and the data of the content that requires complaint resolution, which are received from the specification unit 26.

The corrected content generation unit 27, for example, sets content in which a predetermined period or longer has elapsed after a delivery is started and complaint resolution is not required or content in which the number of times of viewing is a predetermined number or more and complaint resolution is not required, among the content stored in the storage unit 25, to a candidate of the first content. The corrected content generation unit 27 selects at least one first content from the candidates of the first content, by using information such as the genre, a tag, or a deliverer of the content that requires complaint resolution, or the information of the relevant image correction period and the relevant sound correction period. The corrected content generation unit 27 may select a plurality of first content.

The corrected content generation unit 27, for example, may select content with a genre and a tag common to the content that requires complaint resolution as the first content, or may select content with the same deliverer as the content that requires complaint resolution as the first content. In addition, the corrected content generation unit 27 may select content including an image (an image with more common motions or features) close to the image that requires complaint resolution of the relevant image correction period in at least a portion as the first content, on the basis of motion information or feature information of the image that requires complaint resolution that is included in the information of the relevant image correction period. In addition, the corrected content generation unit 27 may select content including a sound (a sound having more common features) close to the sound that requires complaint resolution of the relevant sound correction period as the first content, on the basis of feature information of the sound that requires complaint resolution that is included in the information of the relevant sound correction period. Note that, it is desirable that the corrected content generation unit 27 selects content that is sufficiently longer than the relevant image correction period and the relevant sound correction period as the first content.

For example, the corrected content generation unit 27 may include a learned model for specifying content having a predetermined motion or feature of an image or a predetermined feature of a sound, among the candidates of the first content. The learned model, for example, is a learned model for specifying the motion or the feature of a playback image or sound of the content data by deep learning such as a convolution neural network (CNN), using the content data satisfying a predetermined condition as input. The corrected content generation unit 27 may include a plurality of learned models respectively corresponding to a plurality of motions or features.

The corrected content generation unit 27 may synthesize the content that requires complaint resolution with an image of a portion of the content for correction by replacing the frame of the relevant image correction period with an image of a partial period of the content for correction. In addition, the corrected content generation unit 27, for example, may synthesize an image of a portion of the first content in the portion of the image that requires complaint resolution of the relevant image correction period by using a known technique such as alpha blending or picture-in-picture.

For example, the corrected content generation unit 27 is capable of generating the second content (corrected content) corrected not to include the image that requires complaint resolution by cutting the frame of the relevant image correction period of the content that requires complaint resolution, and by trimming a frame of the period corresponding to the relevant image correction period from the selected content for correction to be replaced with the frame of the relevant image correction period (or by superimposing the trimmed frame on the frame of the relevant image correction period).

In a case where there is a plurality of first content, the corrected content generation unit 27 is capable of generating a plurality of second content by using a partial period of each of the plurality of first content. In addition, the corrected content generation unit 27 may generate the plurality of second content by trimming images of a plurality of periods from one first content.

In a case where the information of the relevant image correction period includes the motion information, the corrected content generation unit 27 may generate the second content by setting a period for trimming the image from the first content such that a start timing of a predetermined motion corresponding to the image of the first content is coincident with a start timing of the motion of the relevant image correction period, and by replacing the frame of the relevant image correction period (or the image that requires complaint resolution) with an image trimmed from the content for correction (or by superimposing the trimmed image).

In addition, in a case where the information of the area that requires complaint resolution is included in the information of the relevant image correction period, the corrected content generation unit 27 may generate the second content by trimming an area according to the feature of the image that requires complaint resolution from the image of the first content, and by replacing (or by superimposing) the area trimmed from the image of the first content on the area that requires complaint resolution in the frame of the relevant image correction period. In this case, the corrected content generation unit 27 may adjust the size by enlarging or reducing the image trimmed from the image of the first content, in accordance with the size of the area that requires complaint resolution of the relevant image correction period.

The corrected content generation unit 27, for example, is capable of generating the second content corrected not to include the sound that requires complaint resolution by cutting a sound of the relevant sound correction period of the content that requires complaint resolution, and by replacing a sound of a period corresponding to the relevant sound correction period trimmed from the selected content for correction with a sound portion of the relevant sound correction period. In a case where there is a plurality of first content, the corrected content generation unit 27 is capable of generating a plurality of second content by using a partial period of each of the plurality of first content. In addition, the corrected content generation unit 27 may generate the plurality of second content by using a plurality of periods of one first content.

The corrected content generation unit 27, for example, may correct the content by trimming a portion of the sound from the content for correction such that a start timing of a conversation or music in the sound of the first content is a start timing of a conversation or music in the relevant image correction period, and by replacing the sound of the relevant image correction period with the trimmed portion of the first content.

The corrected content generation unit 27 stores at least one of the data of the generated second content in the storage unit 25. The corrected content generation unit 27 may store the data of the second content as the content data in the storage unit 25 instead of the original content by deleting data of the original content before being corrected when storing the data of the second content, or may store the data of the second content in the storage unit 25 in association with the original content before being corrected. In addition, the corrected content generation unit 27 may store information indicating that a response has been completed with respect to the complaint information in the storage unit 25 together with the data of the second content.

The corrected content generation unit 27 may present the generated second content to the deliverer terminal 10, and the deliverer may be capable of selecting the availability of correction. In this case, the corrected content generation unit 27 is capable of presenting one or a plurality of second content to the deliverer terminal 10. In this case, the corrected content generation unit 27 may present at least the corrected portion in the second content to the deliverer terminal 10. The deliverer terminal 10 transmits information of the availability of the correction of the content and the second content that is selected in a case where the correction is available to the corrected content generation unit 27, on the basis of the manipulation of the deliverer. In a case where there is second content that is selected as correctable content by the deliverer terminal 10, the corrected content generation unit 27 is capable of storing the selected second content in the storage unit 25.

Figure 3:
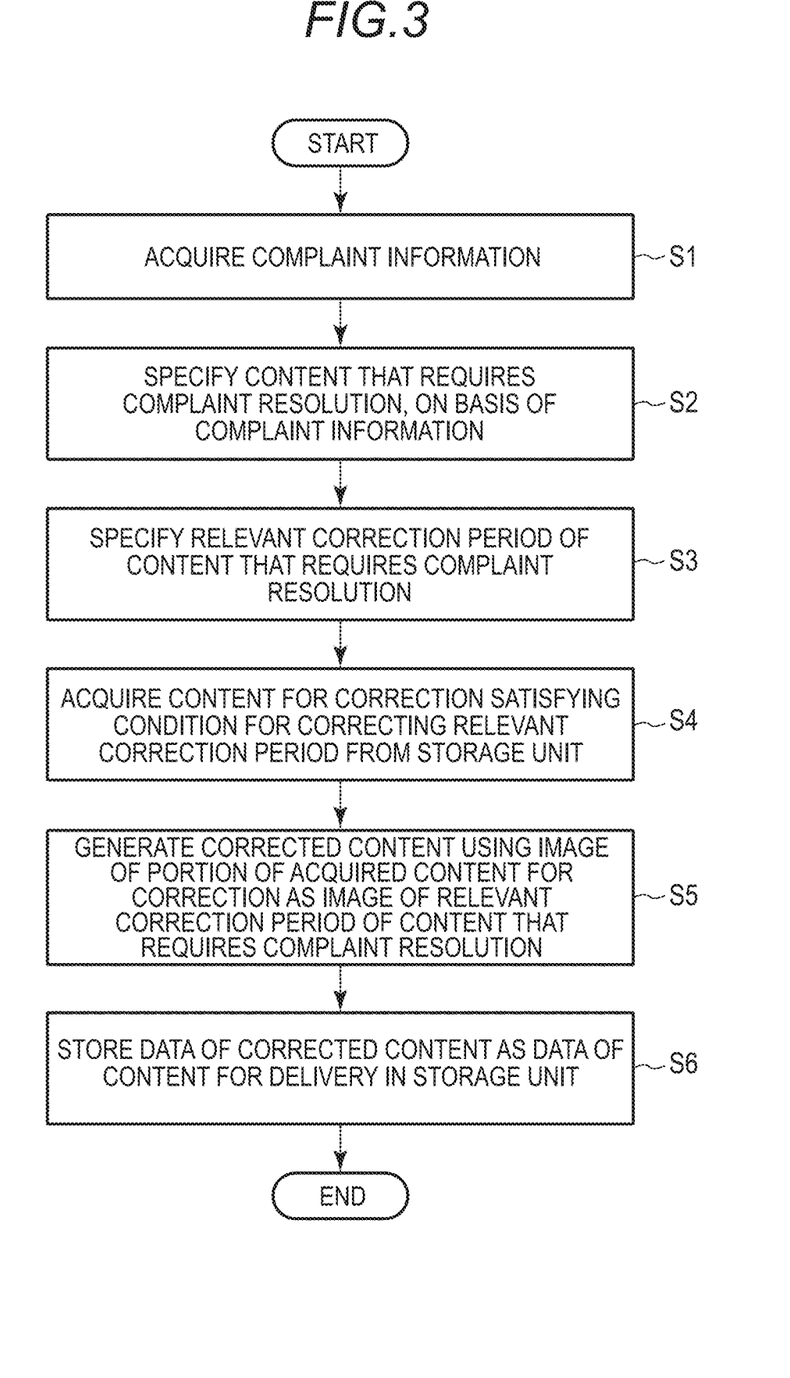
FIG. 3 is a flowchart for illustrating an example of a content correction method of one embodiment.

Hereinafter, an example of the operation of the content correction device and the content delivery server 20 described above will be described with reference to the drawings. FIG. 3 is a flowchart for illustrating an example of a content correction method of one embodiment. FIG. 4 to FIG. 8 are diagrams for illustrating an example of an operation for the content correction device and the content delivery server of one embodiment to correct the content.

Here, the operation of the content correction device and the content delivery server 20 when generating the corrected second content by synthesizing the frame or the image of a portion of the first content in an area of at least a portion of the frame of the relevant image correction period of the content that requires complaint resolution, will be described with reference to FIG. 4 and FIG. 8. Note that, in FIG. 4 and FIG. 8, an example of correcting a portion of the image of the content that requires complaint resolution is illustrated, but the same operation can also be performed when correcting the sound, and the same operation can also be performed when correcting both of the image and the sound.

First, the second acquisition unit 212 of the content delivery server 20 acquires the complaint information (step S1). In this case, the second acquisition unit 212, for example, may receive only the complaint information from the complaint transmission source registered in advance, or for example, may receive only the complaint information that has been determined as a valid complaint. The second acquisition unit 212 transmits the received complaint information to the specification unit 26.

The specification unit 26 specifies the content that requires complaint resolution among the content data stored in the storage unit 25 by using the identification information of the content that requires complaint resolution that is included in the complaint information received from the second acquisition unit 212 (step S2).

Subsequently, the specification unit 26, for example, specifies the relevant image correction period of the content that requires complaint resolution, on the basis of the information of the image that requires complaint resolution that is included in the complaint information. Note that, for example, in a case where the information of the period that requires complaint resolution (a time zone of the complaint to be resolved in the time line) is included in advance in the complaint information, the specification unit 26 may set the period that requires complaint resolution as the relevant image correction period (step S3).

Figure 4:
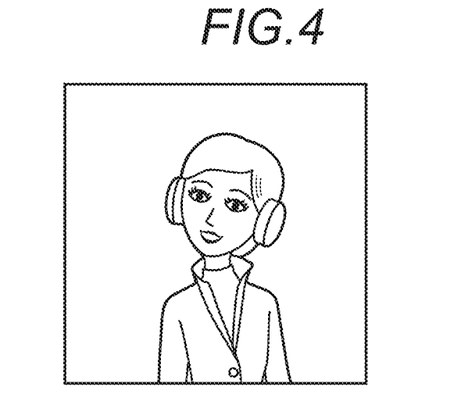
FIG. 4 is a diagram illustrating an example of an operation for the content correction device and the content delivery server of one embodiment to correct content.

In FIG. 4, an example of the image that requires complaint resolution that is included in the complaint information is illustrated. In this example, the image that requires complaint resolution is an image of a person. The specification unit 26, for example, specifies a frame in which the image of the complaint to be resolved is included in the content that requires complaint resolution by using the image of the person that is included in the image that requires complaint resolution, and sets a period corresponding to the specified frame to the relevant image correction period.

Figure 5:
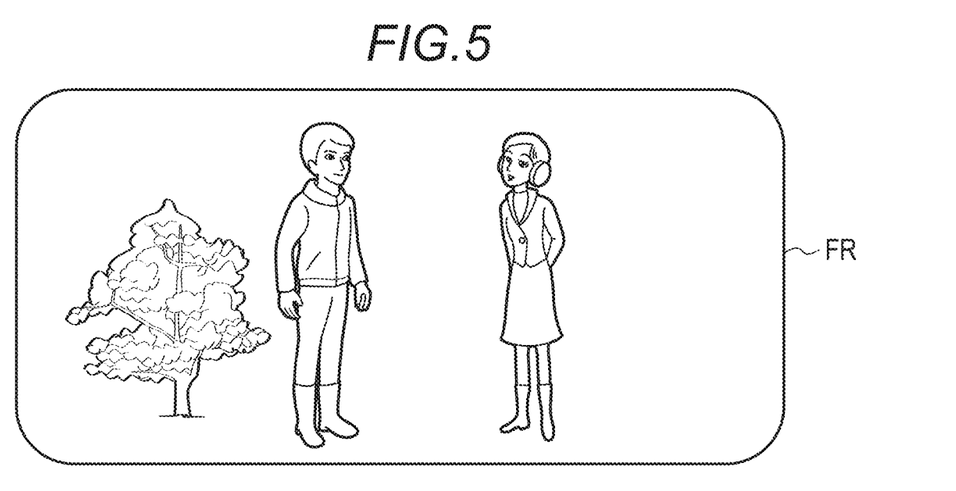
FIG. 5 is a diagram for illustrating an example of the operation for the content correction device and the content delivery server of one embodiment to correct the content.

In FIG. 5, an example of a frame FR of the relevant image correction period specified by the specification unit 26 using the image that requires complaint resolution in FIG. 4 is illustrated. The specification unit 26 specifies a period including the frame FR in which the image of the person of the complaint to be resolved is included as the relevant image correction period. Note that, for example, even in a case where there are one or a plurality of frames not including the image that requires complaint resolution between a first frame and a second frame including the image that requires complaint resolution, but a period between the first frame and the second frame is shorter than a predetermined period, the specification unit 26 may set a period corresponding to the entire frame from the first frame to the second frame as the relevant image correction period. Note that, in a case where the relevant sound correction period is specified by using the information of the sound that requires complaint resolution, the specification unit 26 may set not only the period in which the sound that requires complaint resolution is included but also the period in which the sound that arranges or covers the sound that requires complaint resolution is included as the relevant sound correction period.

In addition, the specification unit 26 may specify the feature such as the gender, the age group, the height and size, the clothing color, the hair, eye, or skin color of the person or the character of the complaint to be resolved, or the feature such as the background of the image, from the image that requires complaint resolution or the image of the entire frame including the image that requires complaint resolution. Note that, when the complaint to be resolved is an object, the specification unit 26 may specify a feature such as the category, the color, or the size of the object of the image that requires complaint resolution. For example, when specifying the feature of the person or the object that is the complaint to be resolved and the feature of the background, the specification unit 26 is capable of including the identification information for identifying the specified feature in the information of the relevant image correction period.

Figure 6:
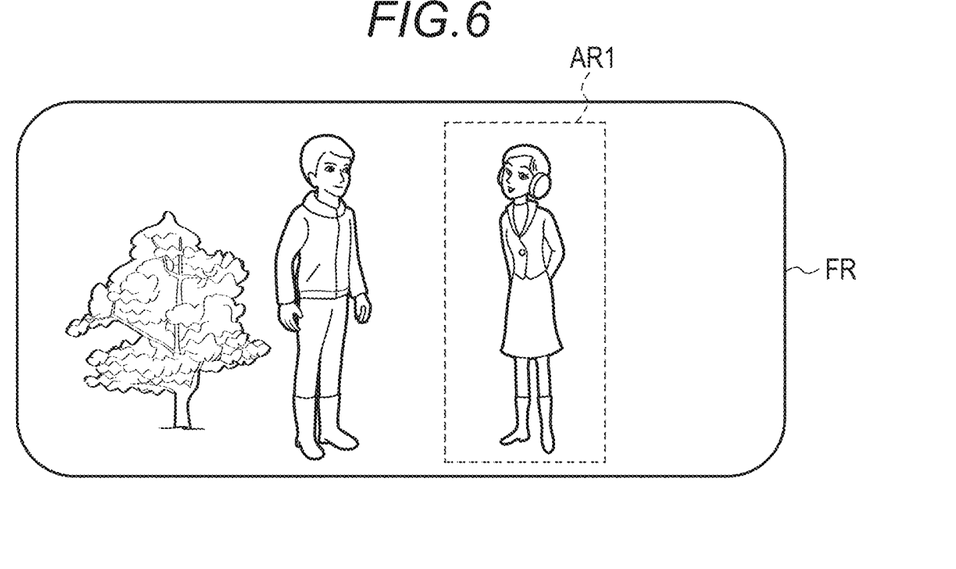
FIG. 6 is a diagram for illustrating an example of the operation for the content correction device and the content delivery server of one embodiment to correct the content.

FIG. 6 illustrates an example of an area (a portion) AR1 that requires complaint resolution of the frame FR in which the image that requires complaint resolution in the frame FR of the relevant image correction period in FIG. 4 is included. The specification unit 26 may further specify the area AR1 of a portion in which image that requires complaint resolution is displayed in the frame FR including the image that requires complaint resolution. In this case, the specification unit 26 includes information of the area AR1 that requires complaint resolution in the information of the relevant image correction period.

The specification unit 26 transmits the information of the specified relevant image correction period and the data of the content that requires complaint resolution to the corrected content generation unit 27.

The corrected content generation unit 27 sets a condition of the first content, on the basis of the information of the relevant image correction period and the data of the content that requires complaint resolution, which are received, and acquires content satisfying the condition from the content stored in the storage unit 25 (step S4). In this case, the corrected content generation unit 27 sets the content in which the predetermined period or longer has been elapsed after the delivery is started and the complaint resolution is not required or the content in which the number of times of viewing is the predetermined number or more and the complaint resolution is not required, among the plurality of content stored in the storage unit 25, to the candidate of the first content used in the correction (the content for correction). In addition, as the condition of the first content that is set by the corrected content generation unit 27, the information such as the genre, the tag, or the deliverer of the content that requires complaint resolution, the feature of the person (or the object) of the complaint to be resolved that is included in the information of the relevant image correction period, or the like can be used.

The corrected content generation unit 27 sets the image of a portion of the acquired first content as the image relevant correction period of the content that requires complaint resolution, and generates the second content not including the image that requires complaint resolution (step S5).

Figure 7:
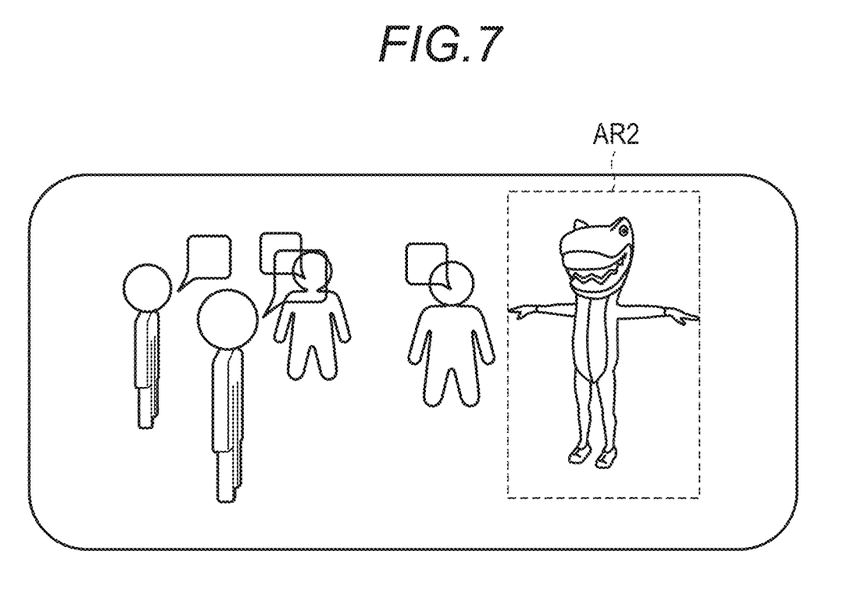
FIG. 7 is a diagram for illustrating an example of the operation for the content correction device and the content delivery server of one embodiment to correct the content.

The corrected content generation unit 27 may generate the second content not including the image that requires complaint resolution by setting the frame of the relevant correction period of the content that requires complaint resolution to the frame of the first content. In this case, the corrected content generation unit 27, for example, is capable of generating the second content not including the image that requires complaint resolution by setting the entire frame FR illustrated in FIG. 5 to the frame of the first content as illustrated in FIG. 7.

In addition, the corrected content generation unit 27 may generate the second content by setting only the area AR1 that requires complaint resolution including the image that requires complaint resolution in the frame of the relevant image correction period to the image of a portion of the frame of the first content. The corrected content generation unit 27, for example, is capable of generating the second content not including the image that requires complaint resolution by selecting an area AR2 according to the feature of the image that requires complaint resolution in the frame of the first content illustrated in FIG. 7, and by replacing (or by superimposing) an image of the area AR2 with the area AR1 of the frame FR.

Figure 8:
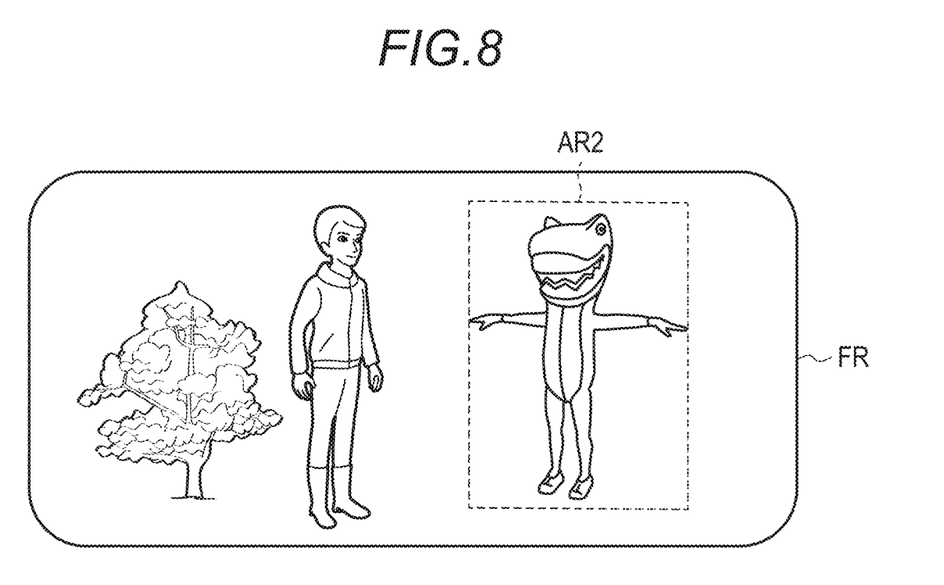
FIG. 8 is a diagram for illustrating an example of the operation for the content correction device and the content delivery server of one embodiment to correct the content.

FIG. 8 is a diagram for illustrating an example of the second content in which a portion of the frame FR of the content that requires complaint resolution is corrected as the image of a portion of the first content. In this case, for example, as illustrated in FIG. 8, only a portion of the frame FR of the content that requires complaint resolution is the image of the area AR2 of the first content, and thus, it is possible to generate the second content (corrected content) not including the image that requires complaint resolution without impairing the overall quality or enjoyability of the content.

The corrected content generation unit 27 stores the data of the generated second content as the data of the content for a delivery in the storage unit 25 (step S6). In this case, the corrected content generation unit 27 may store the data of the second content in the storage unit 25 only in a case where the generated second content is presented to the deliverer terminal 10, and the permission of the correction is obtained from the deliverer terminal 10. In addition, when the corrected content generation unit 27 generates a plurality of second content, data of at least one second content may be stored in the storage unit 25, or only the data of the second content selected by the deliverer may be stored in the storage unit 25.

As described above, according to the content correction device and the content delivery server of this embodiment, it is possible to correct the content without impairing the quality or the enjoyability of the content, by using other content images or sounds but not by simply deleting a portion of the content or pixelating the image. That is, according to this embodiment, it is possible to provide a content correction device, a content delivery server, a content correction method, and a recording medium for correcting a portion of content that requires complaint resolution without impairing the quality or the enjoyability of the content.

In addition, in this embodiment, it is not necessary for the deliverers themselves to determine which portion of which content is a portion that does not require complaint resolution, and thus, it is possible to reduce effort and time required for correcting the content that requires complaint resolution.

Note that, the invention is not limited to the embodiments, and can be modified in various ways without departing from the scope at the implementation phase. In addition, each of the embodiments may be implemented by being suitably combined, and in such a case, a combined effect can be obtained. Further, various inventions are included in the embodiments described above, and various inventions can be extracted by a combination selected from a plurality of disclosed configuration requisites. For example, even in a case where some configuration requisites are deleted from all the configuration requisites described in the embodiments, but the problems can be solved and the effects can be obtained, a configuration in which the configuration requisites are deleted can be extracted as the invention.

REFERENCE SIGNS LIST

10 Deliverer terminal
20 Content delivery server
21 Acquisition unit
211 First acquisition unit
212 Second acquisition unit
22 Delivery control unit
23 Generation unit
24 Delivery unit
25 Storage unit
26 Specification unit
27 Corrected content generation unit
30 Viewer terminal
FR Frame
AR1 Area that requires complaint resolution
AR2 Area

The invention claimed is:

1. A content correction device comprising a processor and configured to:
   acquire complaint information including at least information of a complaint to be resolved and identification information of content that requires complaint resolution;
   acquire, based on the identification information of the content that requires complaint resolution, data of the content that requires complaint resolution from a storage unit in which data of a plurality of delivered content is stored;
   specify, based on the information of the complaint to be resolved, a relevant correction period in which the complaint to be resolved is included in a time line of the content that requires complaint resolution;
   acquire data of first content for correcting the complaint to be resolved that is included in the relevant correction period from the storage unit;
   generate second content in which the complaint to be resolved is not included by using at least a portion of the first content;
   store data of the second content as the data of the content in the storage unit;
   store the complaint information in the storage unit in association with the data of the content that is specified as the content that requires complaint resolution; and
   set the content in which a predetermined period or longer has elapsed after a delivery is started and the complaint information is not included or the content in which the number of times of viewing is a predetermined number or more and the complaint information is not included, among the plurality of delivered content stored in the storage unit, to a candidate of the first content.

2. The content correction device according to claim 1, wherein the information of the complaint to be resolved includes at least one of: information of an image that requires complaint resolution, information of a sound that requires complaint resolution, and a period that requires complaint resolution.

3. The content correction device according to claim 1, wherein the content correction device is further configured to:
   specify a timing when a predetermined motion is started in the relevant correction period;
   acquire the data of the first content in which the predetermined motion is included from the storage unit; and correct the relevant correction period by using at least one of an image and a sound of a portion of the first content that is trimmed such that a timing of the predetermined motion in the first content is coincident with the timing of the predetermined motion in the relevant correction period.

4. The content correction device according to claim 1, wherein the content correction device is further configured to:
specify a feature of the complaint to be resolved; and
select at least one of the first content from the data of the plurality of delivered content stored in the storage unit, by using information of the feature of the complaint to be resolved.

5. The content correction device according to claim 1, wherein the complaint to be resolved is an image that requires complaint resolution, and
wherein the content correction device is further configured to:
specify an area that requires complaint resolution in which the image that requires complaint resolution is included in a frame of the relevant correction period;
trim an image corresponding to the area that requires complaint resolution from a frame of the first content; and
generate the second content in which the area that requires complaint resolution is corrected by using the trimmed image.

6. A content delivery server comprising the content correction device according to claim 1 and configured to:
deliver the data of the content stored in the storage unit; and
control delivery of the data of the content such that the data of the content is delivered to a viewer terminal that requests a delivery.

7. A content correction method, comprising:
acquiring complaint information including at least information of a complaint to be resolved and identification information of content that requires complaint resolution;
acquiring, based on the identification information of the content that requires complaint resolution, data of the content that requires complaint resolution from a storage unit in which data of a plurality of delivered content is stored;
specifying, based on the information of the complaint to be resolved, a relevant correction period in which the complaint to be resolved is included in a time line of the content that requires complaint resolution;
acquiring data of first content for correcting the complaint to be resolved that is included in the relevant correction period from the storage unit;
generating second content in which the complaint to be resolved is not included by using at least a portion of the first content;
storing data of the second content as the data of the content in the storage unit;
storing the complaint information in the storage unit in association with the data of the content that is specified as the content that requires complaint resolution; and
setting the content in which a predetermined period or longer has elapsed after a delivery is started and the complaint information is not included or the content in which the number of times of viewing is a predetermined number or more and the complaint information is not included, among the plurality of delivered content stored in the storage unit, to a candidate of the first content.

8. A non-transitory computer-readable storage medium containing instructions which, when executed by a processor, cause the processor to carry out the content correction method according to claim 7.

* * * * *